United States Patent [19]

Harrington

[11] Patent Number: 4,864,647

[45] Date of Patent: Sep. 5, 1989

[54] WIRELESS INFRARED REMOTE CONTROL EXTENDER

[75] Inventor: Christopher C. Harrington, Pittsburgh, Pa.

[73] Assignee: Modcom Corporation, Pittsburgh, Pa.

[21] Appl. No.: 135,014

[22] Filed: Dec. 18, 1987

[51] Int. Cl.[4] .................... H04B 9/00

[52] U.S. Cl. .................... 455/603; 455/601; 455/606; 455/617

[58] Field of Search .............. 455/600, 601, 603, 606, 455/607, 617, 618, 619, 613, 609; 250/214 B

[56] References Cited

U.S. PATENT DOCUMENTS

| | | | |
|---|---|---|---|
| 3,513,443 | 5/1970 | Andersen | 455/603 |
| 4,290,043 | 9/1981 | Kaplan | 455/604 |
| 4,303,855 | 12/1981 | Bapst | 455/619 |
| 4,509,211 | 4/1985 | Robbins | 455/603 |
| 4,709,412 | 11/1987 | Seymour | 455/603 |

*Primary Examiner*—Robert L. Griffin
*Assistant Examiner*—Leslie Van Beek
*Attorney, Agent, or Firm*—Reed Smith Shaw & McClay

[57] ABSTRACT

One or more infrared receiver units communicate by radio to an infrared transmitter unit in order to extend the operational range of an infrared remote control device that normally operates an electrical or electromechanical apparatus. The receiver converts the infrared radiation pattern produced by the infrared remote control device into a radio signal at a suitable frequency. The transmitter, located adjacent the apparatus, converts the radio signal back into the original infrared siganl used to operate the apparatus.

1 Claim, 2 Drawing Sheets

WIRELESS INFRARED REMOTE CONTROL EXTENDER

BACKGROUND OF THE INVENTION

The present invention relates in general to remote control systems and, in particular, to a remote control extension system for use in conjunction with existing remote control equipment.

Remote control systems for audio and video equipment normally comprise a battery-powered, hand-held, transmitter which encodes and transmits elected keyboard information and generates the necessary control signals for operating the selected functions of the user's equipment. Most such systems employ a transmission system operable in the infrared region of the spectrum for transmitting the control data. Such a device allows one to operate the equipment from a distance, without connecting wires.

The drawback of this means of control is that the hand-held controller must be in line of sight with the equipment. This prevents the use of the remote controller in another room or even in a large room. Many people place an additional pair of speakers in a different room so that they may enjoy the benefits of their equipment in remote places. The user cannot, however, control the equipment from those locations. Under these conditions, it is apparent that a need exists for a device or means which will enable the user of infrared remote controllable equipment to use their remote controllers in locations not in line of sight with the equipment.

Equipment now available to perform this function is limited in that the user must connect the transmitter and receiver units with a transmission line. See, for instance, U.S. Pat. No. 4,509,211 to Robbins. This usually requires modification of the user's facilities at an added cost and inconvenience. It also means the equipment cannot be easily moved to another location.

OBJECT OF THE INVENTION

Accordingly, the underlying object of the invention is to provide a practical means for extending the operational range of an infrared data link. The range is extended beyond line-of-sight by introducing a radio relay between the hand-held controller and the controlled apparatus. Any control function normally allowed of the user with the receiver control is now available in the room with the receiver.

Another objective of the invention is to provide such a device whose function and packaging does not interfere with the normal operation of the controlled apparatus, requires no modification of the user's equipment or facilities, and requires no special setup procedure. These and other objects of the present invention are achieved with a remote control apparatus for activating a device capable of being controlled by an infrared signal comprising: means for transmitting a radio signal; and means for receiving the radio signal and producing an infrared signal corresponding to the radio signal received. The receving means is positioned such that the infrared signal can control the device.

In a more preferred embodiment, the transmitting means includes an infrared radiation transmitter for transmitting a second infrared radiation signal, and means for receiving the second infrared radiation signal and producing a radio signal corresponding to the second infrared signal received by it.

BRIEF DESCRIPTION OF THE DRAWINGS

There follows a detailed description of the invention, reference being made to the drawings in which like reference numerals identify like elements of structure in each of the several figures.

DETAILED DESCRIPTION OF THE PREFERRED EMBODIMENT

The following detailed description is of the best presently contemplated modes of carrying out the invention. This description is not to be taken in a limiting sense, but is made merely for purposes of illustrating the general principles of the invention, since the scope of the invention is best defined by the appended claims.

Figure 1:
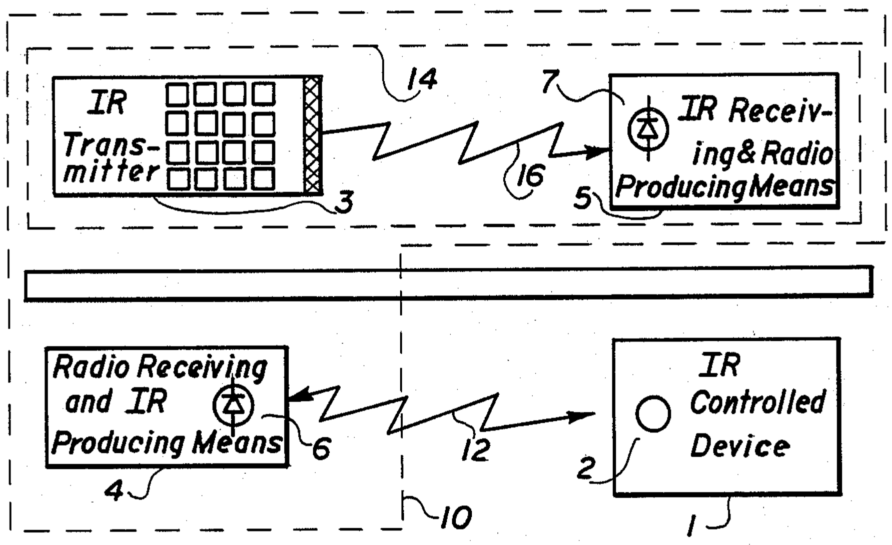
FIG. 1 is a diagrammatic view illustrating the fundamental components of the system incorporating the present invention.

Referring to FIG. 1 there is shown a remote control apparatus 10 for activating a device 1 which is capable of being controlled by an infrared radiation signal 12. The apparatus 10 includes means 14 for transmitting a radio signal and means 4 for receiving the radio signal and producing the infrared signal 12 corresponding to the radio signal received. The receiving means 4 is positioned such that the infrared signal 12 produced by the receiving means 4 can control the device 1. The transmitting means 14 can, for example, include an infrared radiation transmitter 3 for transmitting a second infrared signal 16, and means 5 for receiving the second infrared radiation signal 16 and producing a radio signal corresponding to the second infrared radiation signal 16 received by it. Preferably, the infrared radiation transmitter 3 is an encoder.

Figure 2:
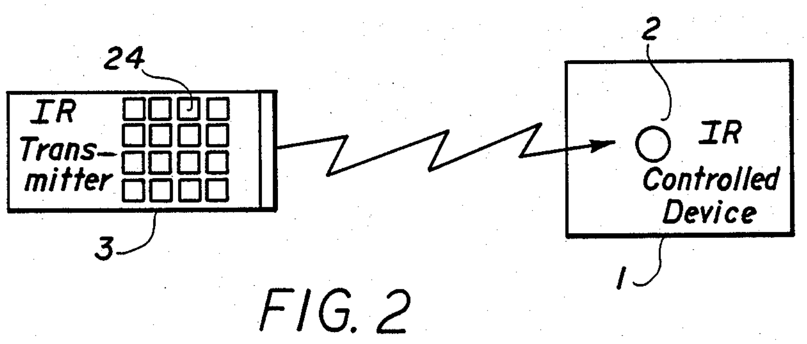
FIG. 2 is a diagrammatic view illustrating a remote controllable apparatus and the companion hand-held control unit.

In a preferred embodiment and referring to FIG. 2 there is illustrated an electrical or electromechanical device 1, such as a sound system or television or the like, which is capable of being controlled by an infrared radiation signal. Utilizing an infrared radiation receiver 2 that cooperates with a remote control infrared radiation transmitter 3, a user can change the operating characteristics of the device 1. Pressing a key 24 on the remote control infrared radiation transmitter 3 causes a signal having a digital code made up of 1's and 0's to be broadcast in the infrared radiation range. The electrical or electromechanical device 1 decodes this signal to perform the desired control function.

Communications is accomplished by means of a light signal emitted from an electroluminescent diode which is amplitude modulated by a modulating frequency in the ultrasonic frequency range. Infrared radiation controllers generally use pulse position modulation (PPM) or pulse code modulation (PCM). For a more detailed description of an infrared radiation controller, see U.S. Pat. No. 4,509,211 to Robbins. The actual technique used does not affect the operation of the present invention. The operation of the present invention is explained with reference to a remote control system in which PCM output signals are generated in response to user operated controls. The control data is digitally encoded by the presence or absence of pulses. The pulses are generated at a frequency in the infrared radiation spectrum and are chopped by a clock signal in the 40 kHz range.

In FIG. 1, the transmitter 3 has been taken to a location beyond the reception range of the receiver 2. The transmitter 3 is made operational by the aid of first and second receiving means which are, for example, companion repeater units 4 and 5. The repeater unit 5 is located at the place where the remote control transmitter 3 is to be operated. The unit 5 includes a detector 7 and suitable amplifier and radio frequency components for converting infrared radiation patterns into an FM radio signal form. The repeater unit 4 includes a radio frequency receiver and infrared emitter 6 located within the range of the receiver 2. The emitter 6 recreates the infrared radiation pattern of the remote control transmitter. The electrical or electromechanical apparatus 1 thereby is made to respond as if the remote control transmitter 3 were close by and in range.

Figure 3:
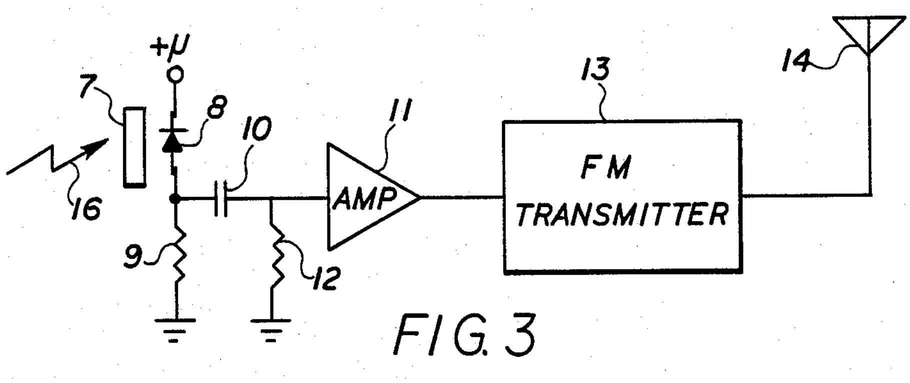
FIG. 3 is a simplified schematic diagram of the infrared to radio repeater unit.

Referring to FIG. 3 there is shown in schematic and block diagram form an infrared radiation remote control detector and FM transmitter in accordance with the present invention.

In the operation of the present invention, a transmitted infrared radiation control signal 16 is incident upon an infrared photodiode 8, such as Part No. TIL 213 of Texas Instruments Company, after transiting optical filter 27. Photodiode 8 is reverse biased by means of a +V voltage source for greater sensitivity and is rendered conducting upon receipt of an incident infrared radiation signal. Connected to the cathode of photodiode 8 is grounded resistor 9 for proper diode biasing. The output of photodiode 8 is AC coupled by means of capacitor 10 to the input of a high gain amplifier 11 for removing a DC ambient light signal from the received pulse control input signal. In addition, capacitor 10 in conjunction with grounded resistor 12 filters out low frequency noise components of the received infrared radiation control signals. The output of the amplifier is the modulating input of a frequency modulated (FM) transmitter 13. The radio frequency energy of the FM transmitter is then radiated by antenna 14.

Figure 4:
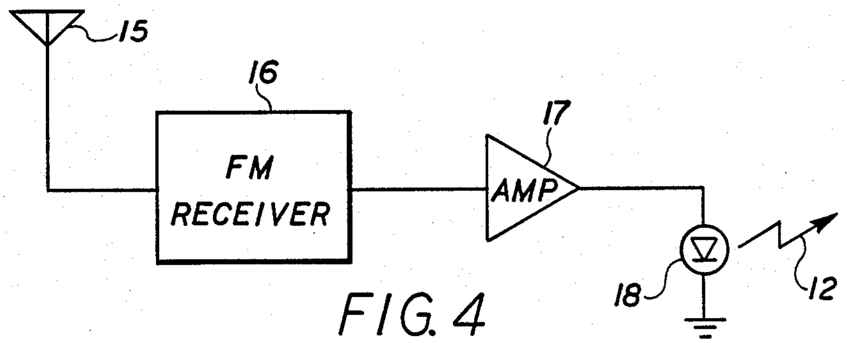
FIG. 4 is a simplified schematic diagram of the radio to infrared repeater unit.

Referring to FIG. 4 there is shown in schematic and block diagram form an FM receiver and infrared emitter in accordance with the present invention.

The antenna 15 picks up the radio frequency energy radiated by the companion antenna 14. In the FM receiver 16, the frequency modulated encoding of the control signal is transformed back into an audio signal. This signal then undergoes amplification in amplifier 17 before being applied to the cathode of an infrared light emitting diode 18, such as Part No. TIL 39 of Texas Instruments Company, the anode of which is grounded. The infrared signal thus emitted is the same as that emitted by the hand-held controller. The electrical or electromechanical apparatus 1 thereby is made to respond as if the remote control transmitter 3 were close by and in range thereof.

This system accommodates any type of infrared remote control transmitter, whatever may be the form of its information coding. Moreover, the system accommodates a plurality of electrical or electromechanical apparatus, each with its own type of remote control infrared transmitter. In addition, a plurality of repeater units 5 may be placed in different locations where control capability is desired.

Although the invention has been described in detail in the foregoing for the purpose of illustration, it is to be understood that such detail is solely for that purpose and that variations can be made therein by those skilled in the art without departing from the spirit and scope of the invention as described by the following claims.

I claim:

1. A remote control apparatus for activating a device capable of being controlled by an infrared signal comprising:
   - an encoder for transmitting a second infrared signal;
   - an infrared photodiode for receiving the second infrared signal, said infrared photodiode having an output corresponding to the second infrared signal received by it;
   - an FM transmitter which receives the output of the photodiode and produces a radio signal corresponding thereto;
   - an FM receiver that receives the radio signal produced by the FM transmitter and has an output corresponding thereto;
   - an infrared light emitting diode which receives the output of the FM receiver and produces a first infrared radiation signal corresponding thereto;
   - an optical filter disposed such that the second infrared radiation signal must pass therethrough in order to be received by the photodiode, said optical filter electrically isolated from the photodiode;
   - a capacitor electrically connected to the photodiode;
   - a grounded resister electrically connected to the capacitor; said resister and capacitor together filtering out any DC ambient light signal received by the photodiode, said capacitor and resistor electrically connected to the photodiode;
   - a high gain amplifier electrically connected to the resistor and capacitor, said amplifier having an output which is received by the FM transmitter;
   - a first antenna electrically connected to the FM transmitter for radiating the radio signal produced by the FM transmitter;
   - a second antenna electrically connected to the FM receiver, said antenna receiving the radio signal; and
   - an amplifier electrically connected between the FM receiver and the infrared light emitting diode for amplifying the output of the FM receiver.

* * * * *